United States Patent [19]
Takahashi

[11] Patent Number: 5,377,204
[45] Date of Patent: Dec. 27, 1994

[54] ERROR DISPLAY SYSTEM

[75] Inventor: Hideo Takahashi, Tokyo, Japan

[73] Assignee: NEC Corporation, Tokyo, Japan

[21] Appl. No.: 782,995

[22] Filed: Oct. 28, 1991

[30] Foreign Application Priority Data

Oct. 26, 1990 [JP] Japan .................................. 2-288938

[51] Int. Cl.⁵ .............................................. G06F 15/20
[52] U.S. Cl. .................................................. 371/29.1
[58] Field of Search ............... 364/514, 550; 371/29.1; 395/200, 250, 575

[56] References Cited

U.S. PATENT DOCUMENTS

| | | | |
|---|---|---|---|
| 3,311,887 | 3/1967 | Muroga | 395/575 X |
| 4,852,088 | 7/1989 | Gulick et al. | 370/94.1 |
| 4,881,167 | 11/1989 | Sasaki et al. | 364/DIG. 1 |
| 4,949,333 | 8/1990 | Gulick et al. | 370/32 |
| 5,003,508 | 3/1991 | Hall | 364/900 |
| 5,170,466 | 12/1992 | Rogan et al. | 395/400 X |
| 5,287,458 | 2/1994 | Michael et al. | 395/250 |

FOREIGN PATENT DOCUMENTS 0239937 10/1987 European Pat. Off. .
0285334 10/1988 European Pat. Off. .

Primary Examiner—Edward R. Cosimano

[57] ABSTRACT

An error display system applied to a control circuit of data communication includes a first first-in-first-out buffer memory and a second first-in-first-out buffer memory. Communication data providing one frame with a plurality of words of which one word is formed of one bit, are sequentially stored for reading out the communication data in the sequence in which it is stored in the first first-in-first-out buffer memory. Last word data and error display data composed of two bits are inputted in the second first-in-first-out buffer memory. One of the two bits represents the last word of the one frame of the communication data and the other bit represents the presence of an error existing within the one frame of the communication data. The first first-in-first-out buffer memory has a larger capacity than that of the one frame.

2 Claims, 5 Drawing Sheets

ERROR DISPLAY SYSTEM

FIELD OF THE INVENTION

The present invention relates to an error display system, and in particular to an error display system applied to a control circuit of data communication.

BACKGROUND OF THE INVENTION

Recently, a first-in-first-out buffer memory (FIFO) which temporarily stores communication data in sequence of receipt thereof has become indispensable and is widely used.

As is well known, FIFO is a buffer memory which stores data and from which reads the data in the order in which the data has been stored. Storing (write) and reading of data may be asynchronously performed.

An example of the above-mentioned communications network control is the Integrated Service Digital Network (ISDN) of a digital communications network which integrally handles various types of services such as telephone, telegraph, telex, data facsimile and the like. These services have recently become commercial in many countries. The communications network control involves a data link control procedure on the D channel (LAPD) in accordance with the layer 2 of ISDN or a high level data link control (HDLC) used in a link access procedure on B channel (LAPB).

The HDLC functions include, as is well known, an automatic zeroing, insertion or deletion of serial data received, inspection of the frame check sequence (FCS) and detecting of a flag abort ineffective frame.

The functions, which are required, are automatic zeroing, deletion of serial data, inspection of the frame check sequence and detection of the flag abort ineffective frame.

For displaying of the result of such inspection and detection at the receiving side, an error display system shown in FIG. 3 is widely known.

Referring to FIG. 3, the conventional error display system is composed of FIFO1 and FIFO3.

FIFO1 is a memory for accumulation of data resulting from the inspection and detection of the HDLC frame. FIFO1 is formed of 16 words with a word length of 1 byte.

FIFO3 is a memory which includes a last byte of the frame and is formed of 16 words with a word length of 1 bit.

The operation of the conventional error display system is as follows:

FIFO1 is inputted with data D1 of the HDLC frame sequentially on a one bit basis at a data input terminal TDI.

Concurrently, FIFO3 is inputted with last byte display data DE of the HDLC frame having a length of one bit at a last byte display input terminal TFI.

The input data DI and DE are written into FIFO1 and FIFO3, respectively, by FIFO write signal WR.

The data accumulated in FIFO1 are outputted from a data output terminal TDO as a data output DO.

Further, a last byte display data DE is outputted from a last byte display output terminal TFO.

The output data DO, DE of FIFO1, and FIFO3, respectively, are renewed by a FIFO data renewal signal input RN.

If the last byte display data DE inputted at the last byte display input terminal TF1 is '0', the input data D1 fed from and in the same timing, at the data input terminal TD1, represents receiving data of the HDLC frame. If the last byte display data DE is '1', the input data D1 is the last data of its frame.

A resultant data of the detection is accumulated in one byte next to the last data of the frame.

When no resultant is found in this error data, such fact is written in the memory.

FIG. 4 is a time chart of the system shown in FIG. 3.

Contents of the data output DO and contents of the last byte display data DE are respectively renewed at a rising edge of the FIFO data renewal signal input RN.

When the contents of the data output DO is shown by data (5) and the last byte display data DE is '1', then error data (2) is outputted at the next rising edge.

In the conventional display system described above, with shorter frame length, in order into insert error data to one byte next to the last data, irrespective of the presence of an error in the HDLC frame, the amount of intrinsic receiving data that is stored in FIFO is decreased, therefore a drawback arises because a time interval for reading out data from the FIFO is increased.

An over-run error may occur, which would result in an inability to write received data, which is a disadvantage of the conventional display system.

SUMMARY OF THE INVENTION

An error display system according to the present invention comprises a first first-in-first-out buffer memory in which communication data providing one frame with a plurality of words, of which one word is formed of one bit, are sequentially stored for reading out the communication data in sequence of storing, and a second first-in-first-out buffer memory in which are inputted the last word and an error display data that are composed of two bits, one bit representing the last word of the one frame of the communication data and the other one bit representing presence of an error existing within the one frame of the communication data, wherein the first first-in-first-out buffer memory has a greater capacity than the one frame.

Further, an error display system of the present invention is such that, even when the error display data of the second first-in-first-out buffer memory indicates the presence of an error, error data are not inserted in a word which is next to the last word of the corresponding frame including the error contents existing within the first first-in-first-out buffer memory.

Still further, an error display system of this invention is constructed such that only when error display data of the second first-in-first-out buffer memory indicates the presence of an error, error data are inserted in a word next to the last word of a corresponding frame including the error contents existing within the first first-in-first-out buffer memory.

BRIEF DESCRIPTION OF THE DRAWINGS

The invention will further be explained with reference to the accompanying drawings.

PREFERRED EMBODIMENTS OF THE INVENTION

Figure 1:
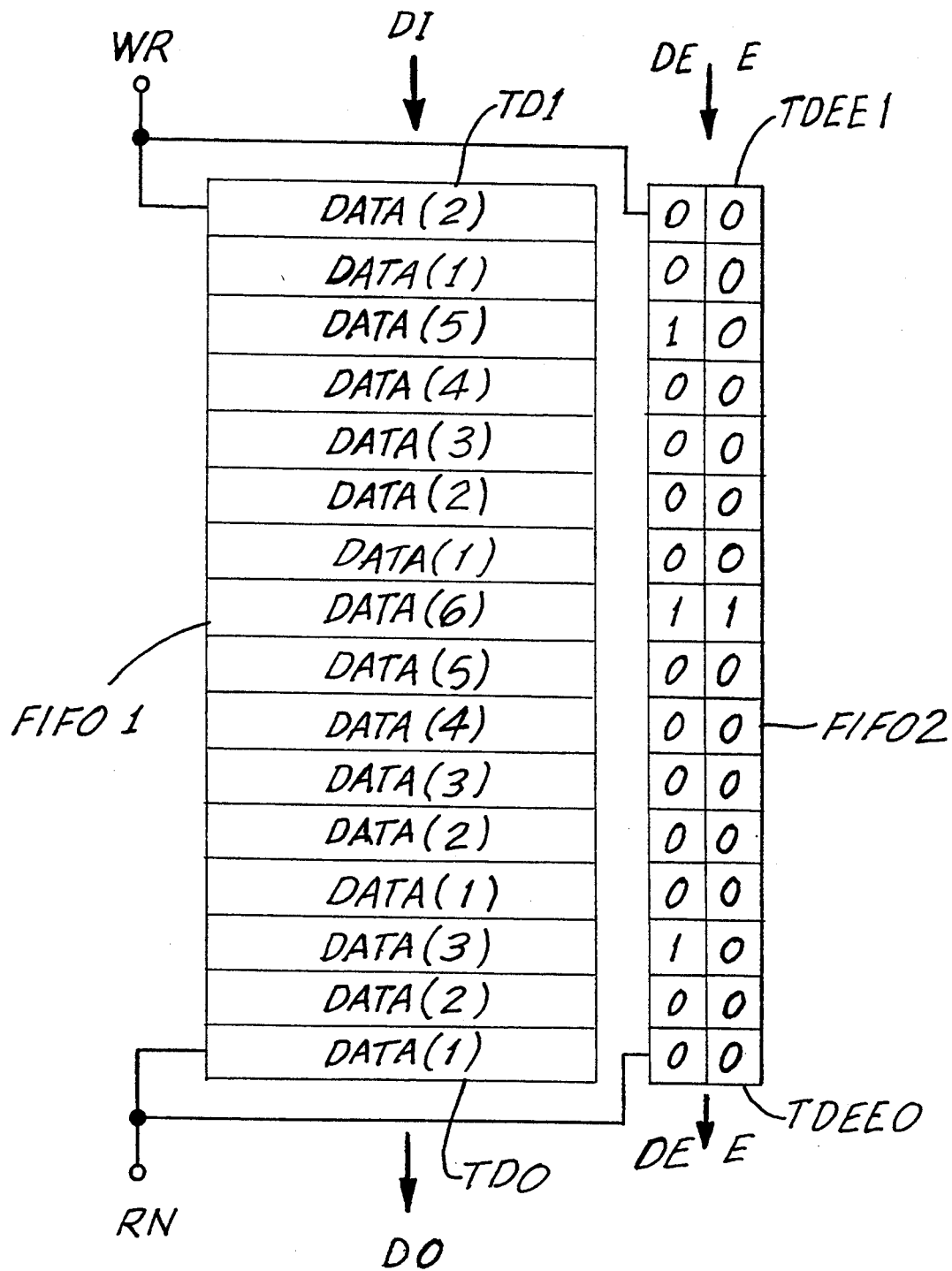
FIG. 1 is a block diagram showing one embodiment of the present invention.

FIG. 1 is a block diagram showing one embodiment in accordance with the invention. In the drawing, symbol FIFO1 identifies a first first-in-first-out buffer memory, and FIFO2 indicates a second first-in-first-out buffer memory. HDLC is a high level data link control provided with the error display system of the present invention.

Referring to FIG. 1, an error display device of the invention comprises FIFO1 and FIFO2.

FIFO1 is the same as shown in the conventional example, and is formed of 16 words with the word length of 1 byte for accumulating resultant data of the inspection or detection of a HDLC frame.

FIFO2 is formed of 16 words with the word length of 2 bits, i.e., one bit representing the last byte of the same frame as shown in the conventional example and the other bit representing error data.

Next, operation of the embodiment is explained.

Figure 3:
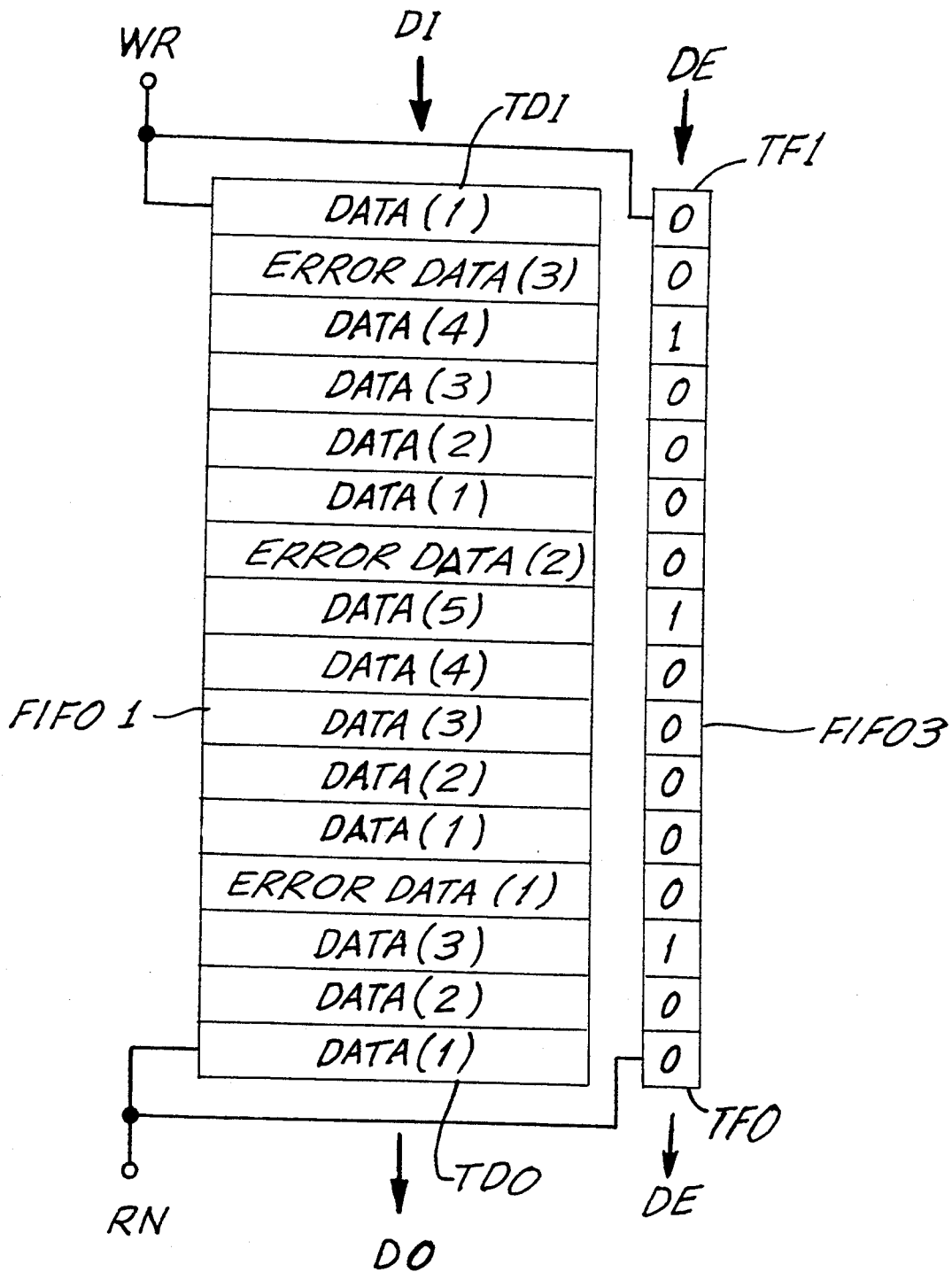
FIG. 3 is a circuit diagram showing one example of a conventional error display system.
Figure 4:
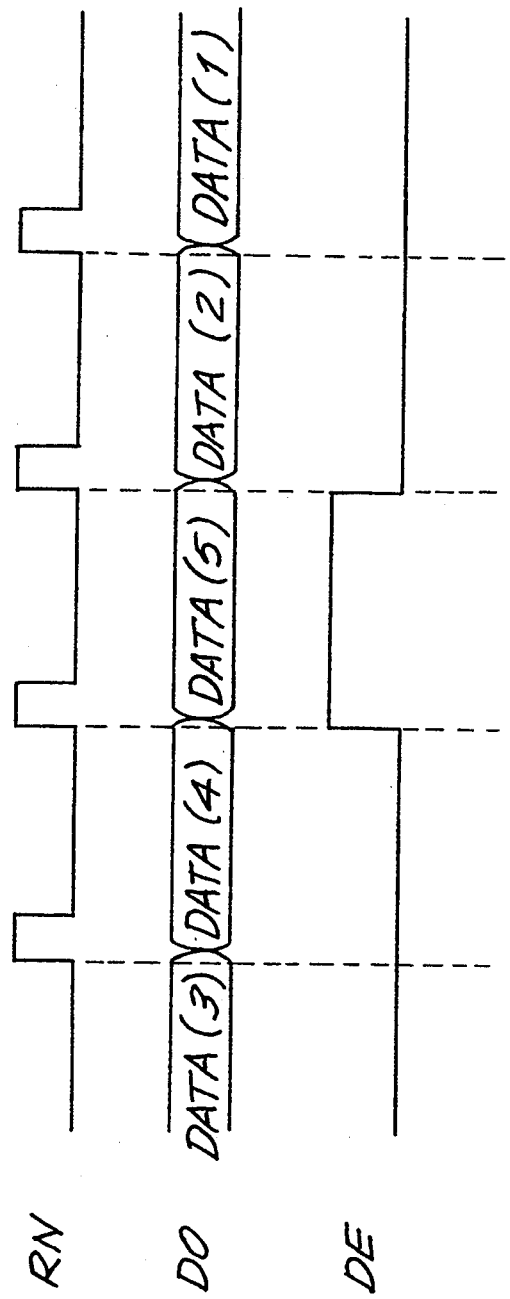
FIG. 4 is an operational time chart of the circuit as shown in FIG. 3.

Reference symbol TDI denotes a data input terminal, DI identifies an input data terminal, similarly to FIG. 3, TDEEI identifies a last byte error display input device, DE is a last byte error display data, and E indicates an error display data.

As in the conventional system described above, data D1 of the HDLC frame is inputted into FIFO1 sequentially on one byte basis at the data input terminal TD1.

At the same time, the last byte error display data is input into FIFO2 DEE of a HDLC frame of 2 bit length data from the last byte error display input terminal TDEEI.

The last byte error display data DEE is formed by a combination of the last byte display data DE of one bit in the conventional example with an error display data E.

The error display data E indicates, using one bit, presence of an error among error data.

A circuit for producing the last byte error display data DEE described above, not shown in FIG. 1, may easily be constituted by well known circuit elements like a comparison circuit, a shift register, and the like, then explanation other than that directly relating to this invention will be omitted to avoid redundancy.

Symbol WR indicates FIFO write signals, TDO identifies a data output terminal, DO denotes a data output, TDEEO indicates a last byte error display output terminal, and RN designates a FIFO data renewal signal input.

The input data D1, DEE are written into FIFO1 and FIFO2, respectively, by FIFO write signals WR.

Data accumulated in FIFO1 is outputted from the data output terminal TDO as data output DO.

Further, the last byte error display data DEE is outputted from the last byte error display output terminal TDEEO.

The output data DO and DEE of the FIFO1 and FIFO2, respectively, are renewed by the FIFO data renewal signal inputted at the terminal RN.

Next, if the last byte display bit of the last byte error display data DEE, inputted at the last byte error display input terminal TDEE1, is '0', the input data D1, inputted at the data input terminal TD1 and in the same timing therewith, represents receiving data of the HDLC frame. If the last byte display bit DE is '1', the input data D1 represents the last data of that frame.

When the last byte display bit DE is '1', and if an error display bit E among the last byte error display data DEE is '0', this indicates that no error exists in the HDLC frame. When the error display bit E is '1', this indicates that error is present in HDLC frame thereof.

When an error report in detail is not required, only the display of the error bit E is enough, and therefore, as previously explained in the conventional example, it is possible to omit the error data using one byte next to the last data of the frame.

Figure 2:
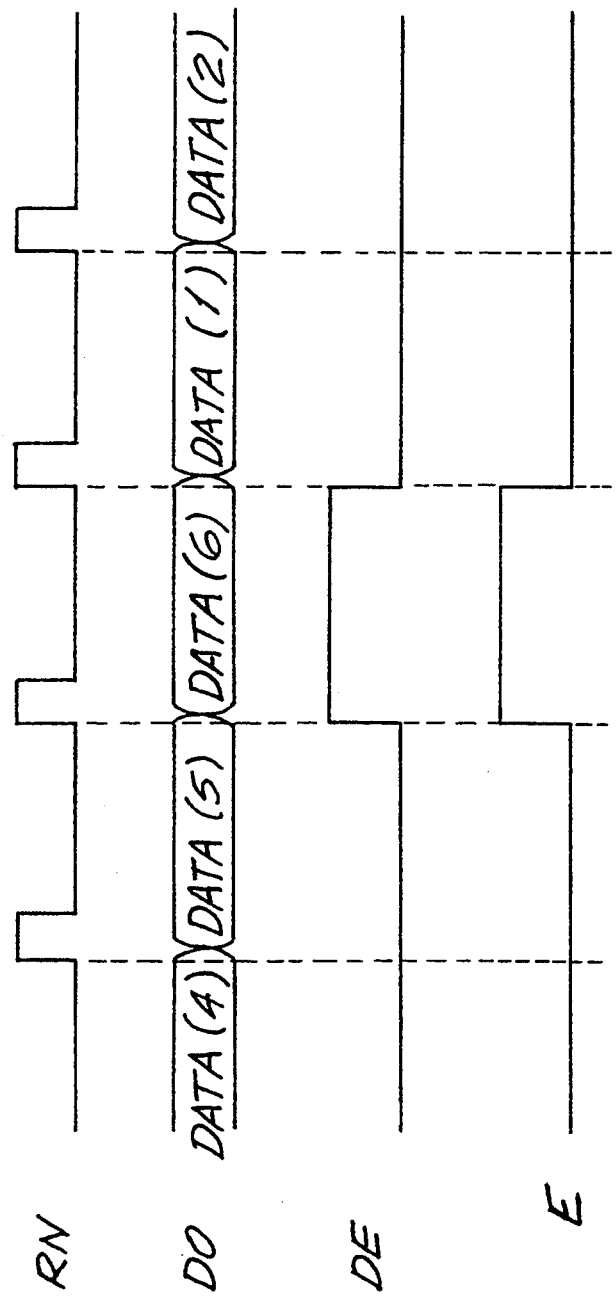
FIG. 2 is an operational time chart of the system shown in FIG. 1.

FIG. 2 is a time chart of the display system of the present embodiment shown in FIG. 1.

The contents of data output DO and the other contents of last byte error display data DEE are respectively renewed at a rising edge of the FIFO data renewal signal input RN.

If the contents of data output DO is shown by data (6) and the last byte display bit DE is '1', then data (1) is outputted at the next rising edge of RN independently of whether the error bit E is '1' or '0'.

A second embodiment of the invention will now be explained. DE indicates a last byte display bit, DEE indicates a last byte error display data, and E identifies an error display bit. HDLC indicates a high level data link control used in a link access procedure on channel B (LAPB), as explained above.

Figure 5:
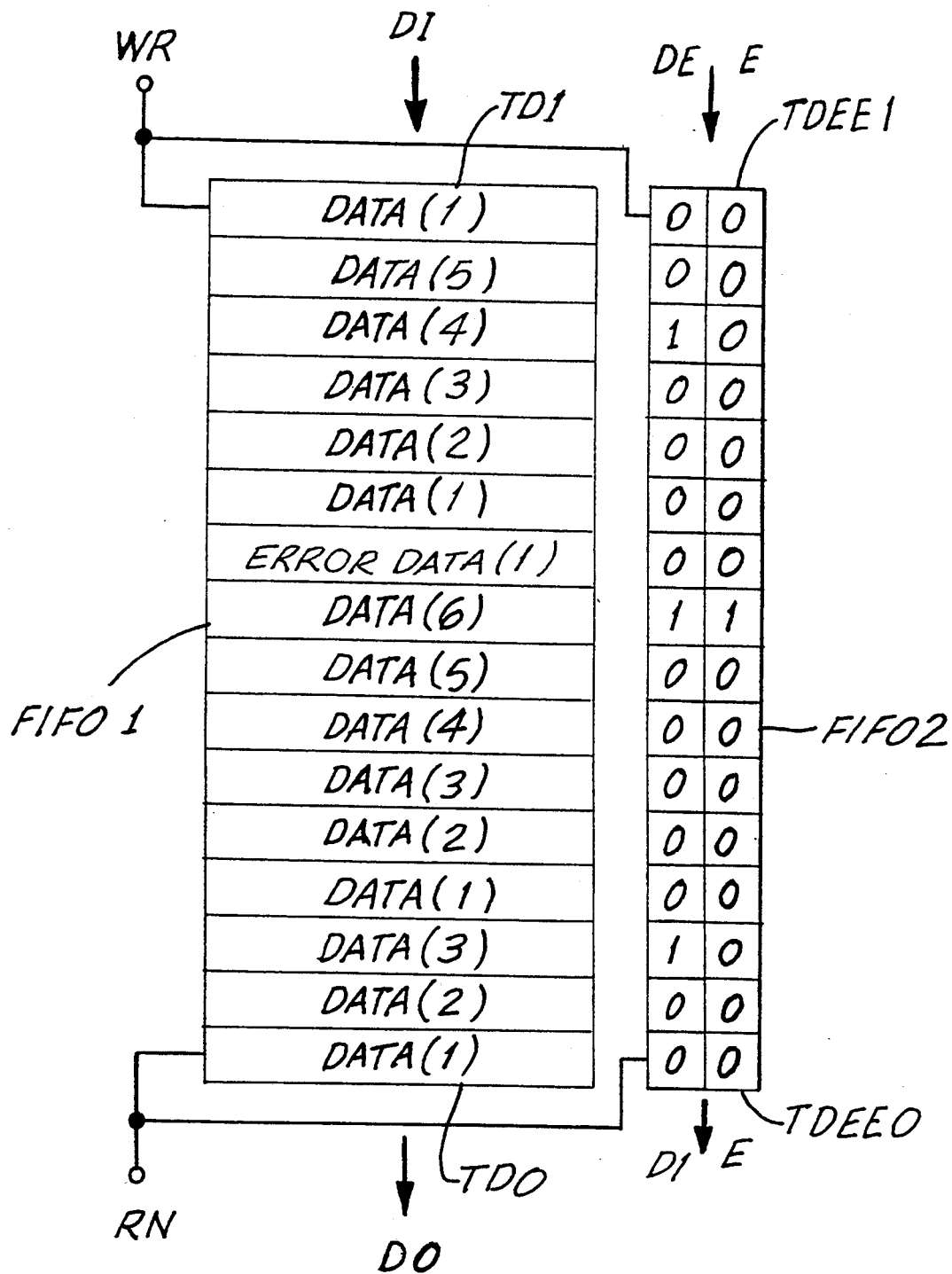
FIG. 5 is a circuit diagram showing another embodiment of the present invention.

The difference between the second embodiment and the first embodiment is that when the last byte display bit DE is '1' and if the error display bit E among the last byte error display data DEE is '1', an error exists in the HDLC frame thereof; consequently an error data is inserted into the next to the last data of the frame, as also shown in FIG. 5.

When the error bit E is '0', no error is present in the HDLC frame thereof, therefore in this case error data is omitted.

While the invention has been shown and described with reference to preferred embodiments thereof, the invention is not limited to the embodiments described in the present specification and drawings and it will therefore be understood that the foregoing and other changes may be made therein without departing from the spirit and scope of the invention.

For example, the number of words in FIFO has been made 16 words for simplification of explanation; however needless to say that any number of words may be applied without departing from the subject matter of the present invention.

As shown and described in the foregoing, by way of providing a first in first out buffer memory for detecting an error bit capable of determining the presence of an error in the frame data, the present invention provides the effect that it is not necessary to insert an error data into one word next to the last data of the frame.

Subsequently even with a shorter frame length, the frame is prevented from reducing the number of intrinsic receiving data which are stored in FIFO; therefore the advantage is in that a time interval required for reading out data from FIFO is not increased.

As a result of the above, the advantage is effectively obtained to reduce the probability of generating an over run status resulting in an inability to write the receiving data because the data processing function of FIFO is not sufficient.

What is claimed is:

1. An error display system comprising a first first-in-first-out buffer memory inputting and sequentially storing communication data providing one frame with a plurality of words of which one word is formed of one byte, for reading out the communication data in sequence of storing,
   a second first-in-first-out buffer memory inputting and storing last word data and error display data composed of two bits, one bit representing the last word of the one frame of the communication data and a second bit representing presence of an error existing within the one frame of the communication data,
   wherein the first first-in-first-out buffer memory has a larger capacity than that of the one frame and wherein even when the error display data of the second first-in-first-out buffer memory indicates presence of an error, an error data is not inserted in a word next to the last word of a corresponding frame including error contents existing within the first first-in-first-out buffer memory.

2. An error display system comprising a first first-in-first-out buffer memory inputting and sequentially storing communication data providing one frame with a plurality of words of which one word is formed of one byte, for reading out the communication data in sequence of storing,
   a second first-in-first-out buffer memory inputting and storing last word data and error display data composed of two bits, one bit representing the last word of the one frame of the communication data and a second bit representing presence of an error existing within the one frame of the communication data,
   wherein the first first-in-first-out buffer memory has a larger capacity than that of the one frame
   and wherein only when the error display data of the second first-in-first-out buffer memory indicates presence of an error, an error data is inserted in a word next to the last word of a corresponding frame including error contents existing within the first first-in-first-out buffer memory.

* * * * *